United States Patent
Okada

[11] Patent Number: 5,926,007
[45] Date of Patent: Jul. 20, 1999

[54] BATTERY CHARGING APPARATUS WHICH DETERMINES A TIME TO COMPLETION OF CHARGING

[75] Inventor: Tetsuya Okada, Sumoto, Japan

[73] Assignee: Sanyo Electric Co., Ltd., Osaka, Japan

[21] Appl. No.: 08/999,676

[22] Filed: Dec. 15, 1997

[30] Foreign Application Priority Data

Dec. 17, 1996 [JP] Japan .................................. 8-337276

[51] Int. Cl.$^6$ .................................................. H01M 10/46
[52] U.S. Cl. ........................ 320/132; 320/150; 320/134
[58] Field of Search ..................... 320/128, 132, 320/134, 136, 144, 150, 156, 157, 163, FOR 131, FOR 134, FOR 138, DIG. 21

[56] References Cited

U.S. PATENT DOCUMENTS 5,541,489  7/1996  Dunstan .................................. 320/134
5,631,540  5/1997  Nguyen .................................. 320/127
5,656,919  8/1997  Proctor et al. ........................... 320/153
5,723,971  3/1998  Sakai et al. ............................. 320/149

FOREIGN PATENT DOCUMENTS 5-283110  10/1993  Japan .
8-298728  11/1996  Japan .

*Primary Examiner*—Edward H. Tso
*Attorney, Agent, or Firm*—Wenderoth, Lind & Ponack, L.L.P.

[57] ABSTRACT

The battery charging apparatus is provided with a memory circuit for pre-storing correlation data between rechargeable battery charge capacity and time to completion of charging, a charge capacity measuring circuit to measure rechargeable battery charge capacity, and a calculating circuit to calculate, during charging, the time to completion of charging based on charge capacity determined by the charge capacity measuring circuit and correlation data stored in the memory circuit.

22 Claims, 3 Drawing Sheets

BATTERY CHARGING APPARATUS WHICH DETERMINES A TIME TO COMPLETION OF CHARGING

BACKGROUND OF THE INVENTION

This invention relates to a battery charging apparatus, and in particular to a battery charging apparatus which displays, during charging, the time to completion when the rechargeable batteries will have reached full charge.

In portable electronic equipment such as camcorders and notebook personal computers, rechargeable batteries are used as the power source. When rechargeable battery power has been consumed by an electronic device, the rechargeable batteries are attached to a charging apparatus and recharged.

The charging apparatus monitors and displays the state of battery charge as the attached rechargeable batteries are charged. For example, as cited in Japanese Non-examined Patent Publication No. 5-283110 issued Oct. 29, 1993 for the case of lithium family rechargeable batteries, the state of battery charge is displayed during charging by monitoring the rechargeable battery voltage up to a specified voltage, and after that by monitoring the rechargeable battery charging current.

Incidentally, displaying the state of battery charge during charging is extremely useful from the rechargeable battery user's perspective. However, it is even more beneficial if the time to the completion of charging for a full charge of the rechargeable batteries is displayed. A system which displays the time to completion of charging is cited in Japanese Non-examined Patent Publication No. 8-298728 issued Nov. 12, 1996. According to this disclosure, the charging voltage characteristic curve and charging current characteristic curve associated with the rechargeable batteries to be charged are pre-loaded into a memory circuit. The rechargeable battery charging current and charging voltage measured by a current sensing circuit and a voltage sensing circuit are related to the pre-loaded charging characteristic curves for calculation of the time to completion of charging by a control circuit. This time to completion is indicated on a display device.

It must be noted that during charging, the charging voltage and charging current characteristic curves are affected and changed by such factors as battery temperature and degree of battery degradation. Consequently, charging current and voltage characteristics measured by the current and voltage sensing circuits become different than the characteristic curves pre-loaded into memory. As a result, an accurate time to completion of charging cannot be calculated.

Therefore, an object of the present invention is to allow for accurate calculation of the time to completion of charging.

The above and further objects and features of the invention will more fully be apparent from the following detailed description with accompanying drawings.

SUMMARY OF THE INVENTION

The charging apparatus of the present invention is characterized by a provision of a memory to pre-load data describing the correlation between rechargeable battery charge capacity and time to completion of charging, a capacity measuring circuit to measure the battery charge capacity during charging, and a computation circuit to calculate, during charging, the time to completion of rechargeable battery charging based on charge capacity measured by the capacity measuring circuit and correlation data stored in memory.

In addition, the charging apparatus of the present invention is characterized by a provision of memory to pre-load a plurality of a data-sets describing the correlation between rechargeable battery charge capacity and time to completion of charging for each temperature, a capacity measuring circuit to measure battery charge capacity during charging, a temperature sensor to measure battery temperature during charging, and a computation circuit to calculate, during charging, the time to completion of rechargeable battery charging based on charge capacity measured by the capacity measuring circuit, battery temperature measured by the temperature sensor, and correlation data stored in memory.

Finally, for charging systems that charge rechargeable batteries with constant current and constant voltage, the present invention is characterized by a provision of a memory to pre-load a plurality of data-sets describing the correlation between rechargeable battery charge capacity and time to completion of charging for each charging current during constant current charging, a capacity measuring circuit to measure battery charge capacity during charging, and a computation circuit to calculate, during charging, the time to completion of rechargeable battery charging based on charging current during constant current charging, charge capacity measured by the capacity measuring circuit, and correlation data stored in memory.

In the present invention a ratio is established between rechargeable battery full charge capacity measured by the capacity measuring circuit and nominal charge capacity. It is a feature of the present invention that the time to completion of rechargeable battery charging calculated by the computation circuit is compensated based on that ratio.

The charging apparatus described above pre-stores data describing the correlation between rechargeable battery charge capacity and time to completion of charging, measures battery charge capacity during charging, and calculates the time to completion of charging. Therefore, the time to completion of rechargeable battery charging can accurately be calculated during battery charging.

Furthermore, since a plurality of correlation data-sets for each battery temperature are stored in memory, the time to completion of charging can always be accurately calculated independent of battery temperature.

DETAILED DESCRIPTION OF THE INVENTION

Figure 1:
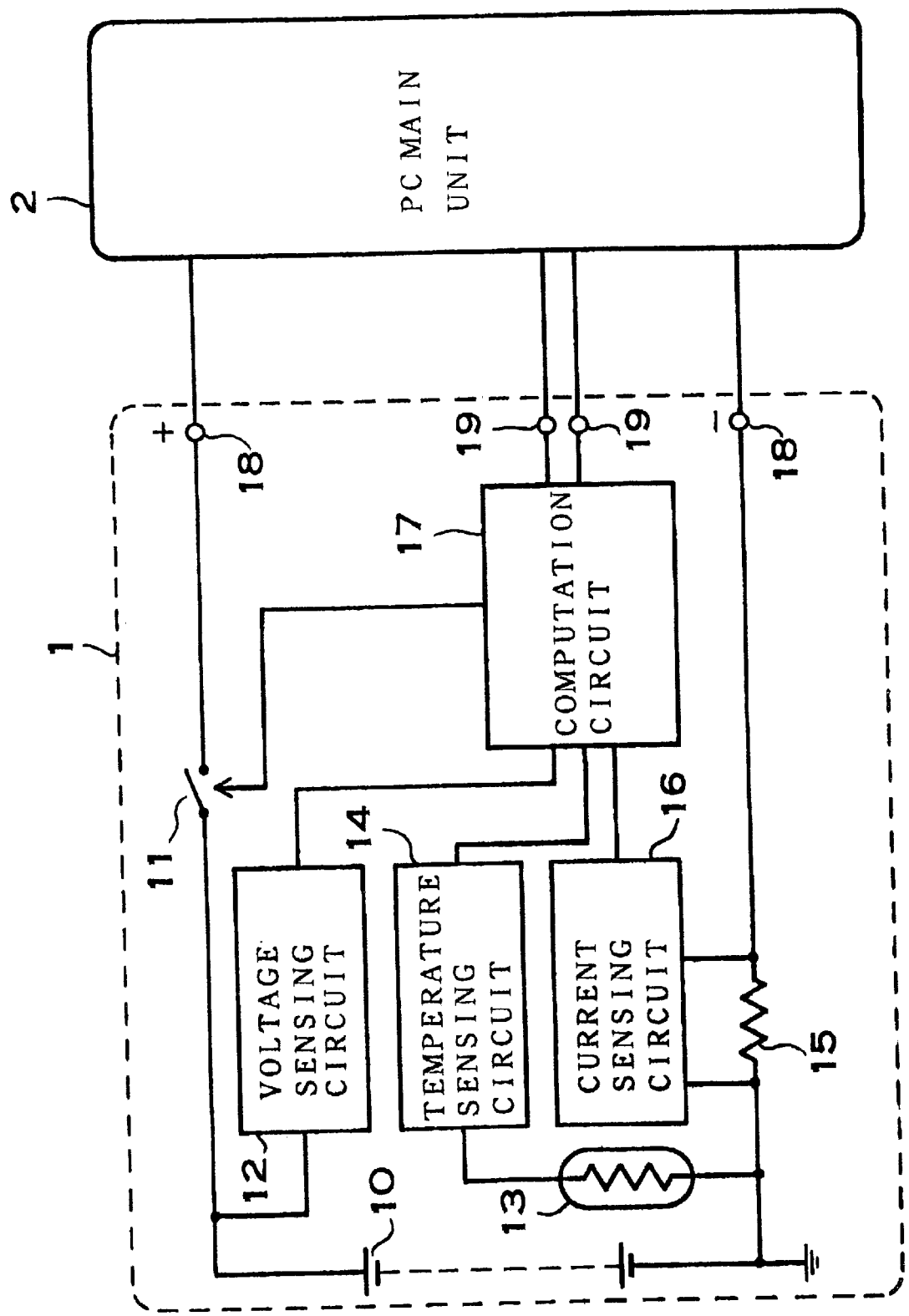
FIG. 1 is a block circuit diagram showing an embodiment of the present invention.

Turning to FIG. 1, a block circuit diagram of an embodiment of the present invention is shown. In FIG. 1, 1 is a battery pack and 2 is a personal computer (PC) main unit. The battery pack 1 is attachable and detachable both mechanically and electrically with the PC main unit 2.

The PC main unit 2 contains a charging circuit (not illustrated) for charging the rechargeable batteries housed in the battery pack 1. In the present embodiment, this charging circuit charges the rechargeable batteries with constant current and constant voltage (charging conditions are, for example, 1CmA of charging current and 4.10V/cell of charging voltage). Further, the PC main unit 2 is provided with a display device to display the calculated time to completion of battery charging.

In the battery pack 1, 10 are lithium ion rechargeable batteries, 11 is a charge-discharge switch connected into the line for charging and discharging the rechargeable batteries 10, 12 is a voltage sensing circuit to measure battery voltage of the rechargeable batteries 10, 13 is a thermistor thermally coupled to the rechargeable batteries 10, 14 is a temperature sensing circuit to measure the temperature of the rechargeable batteries 10 based on output from the thermistor 13, 15 is a current sense resistor connected in the charge-discharge circuit, 16 is a current sensing circuit to measure charging current based on output from the current sense resistor 15, and 17 is a computation circuit to receive measurement signals from the voltage sensing circuit 12, the temperature sensing circuit 14, and the current sensing circuit 16, and to perform various arithmetic processing and computation.

The provision of a calculation circuit as part of the computation circuit 17 to calculate the time to completion of rechargeable battery 10 charging during charging is a significant feature. The computation circuit 17 is also provided with a memory circuit to pre-store data indicating the correlation between rechargeable battery 10 charge capacity and the time to completion of charging. In the computation circuit 17 of the present embodiment, data for battery temperatures of 0° C. and 25° C. are stored in memory. This is data measured under charging conditions for actual charging of the rechargeable batteries 10. For example, charging time corresponding to battery charge capacity is measured by charging the rechargeable batteries 10 from zero charge capacity with constant current and constant voltage regulated to 1CmA charging current, 4.10V/cell charging voltage, and at battery temperatures of 0° C. and 25° C.

Note that the correlation data is not limited to the two data-sets described above. Three or more data-sets may be loaded into memory, and in that such a case, the time to completion of charging can be calculated with even greater precision.

The computation circuit 17 also contains a charge capacity measuring circuit to measure rechargeable battery 10 charge capacity by integrating charging current measured by the current sensing circuit 16. During charging, the computation circuit 17 thereby calculates the time to completion of charging based on measured charge capacity and data stored in memory.

Further, in FIG. 1, 18 are charge-discharge terminals and 19 are communication terminals for communication between the computation circuit 17 and the PC main unit 2.

An operation of the circuit shown by the block circuit diagram of FIG. 1 is described as follows. The battery pack 1 is attached to the PC main unit 2. When a charging start switch (not illustrated) is turned on, the computation circuit 17 switches the charge-discharge switch 11 to the on state and rechargeable battery 10 charging is started. This charging is performed with constant current regulated to 1CmA and constant voltage regulated to 4.10V/cell.

As charging current is supplied to the rechargeable batteries 10, the magnitude of that current is measured by the current sense resistor 15 and the current sensing circuit 16. The computation circuit 17 determines rechargeable battery 10 charge capacity by performing time integration of the measured charging current. Further, for the case where the rechargeable batteries 10 have residual charge capacity when charging is started, the computation circuit 17 adds that residual charge to the measured charge capacity to determine rechargeable battery 10 charge capacity.

Further, the computation circuit 17 determines which data-set to select based on battery temperature measured by the thermistor 13 and the temperature sensing circuit 13. Specifically, the computation circuit 17 selects appropriate data from rechargeable battery 10 charge capacity vs. time to completion of charging correlation data stored in memory. In selection of this data, the data closest to the measured temperature is chosen. Otherwise, an average of the two data-sets closest to the measured temperature may be used. The computation circuit then uses rechargeable battery 10 charge capacity and the selected data to calculate the time to completion of charging at that particular point. Finally, the calculated time to completion of charging is transmitted to the PC main unit 2 via the communication terminals 19 and displayed on the PC main unit 2 display device.

Calculation of the time to completion of charging is performed continuously or periodically until the rechargeable batteries 10 are fully charged. When the rechargeable batteries 10 reach full charge, the computation circuit 17 switches the charge-discharge switch to the off state to end battery charging.

Determination of full battery charge is performed by the current sensing circuit 16 when charging current drops below a specified current, or by the computation circuit 17 when the calculated time to completion of charging becomes zero, or by other techniques.

Note that repeated charging and discharging of the rechargeable batteries 10 is accompanied by gradual battery degradation and a drop in actual charge capacity at full charge. Consequently, an error gradually develops in the time to completion of charging calculated by the computation circuit 17 based on the data stored in memory, which is data for the rechargeable batteries 10 in an undegraded state (rechargeable batteries at rated charge capacity). Specifically, as rechargeable battery 10 degradation progresses, the calculated time to completion of charging becomes greater than the actual time to completion.

Therefore, in the present embodiment, when the computation circuit 17 determines that the rechargeable batteries 10 have reached full charge, the actual charge capacity at that point (that is, the full charge capacity calculated by the computation circuit 17 at that point) is compared with the batteries' nominal charge capacity. That ratio (calculated actual charge capacity/nominal charge capacity) is computed and retained in memory. The computation circuit 17 then compensates the time to completion of charging calculated with initial data by multiplying by the ratio retained in memory. This results in the calculation of an accurate time to completion of charging.

Figure 2:
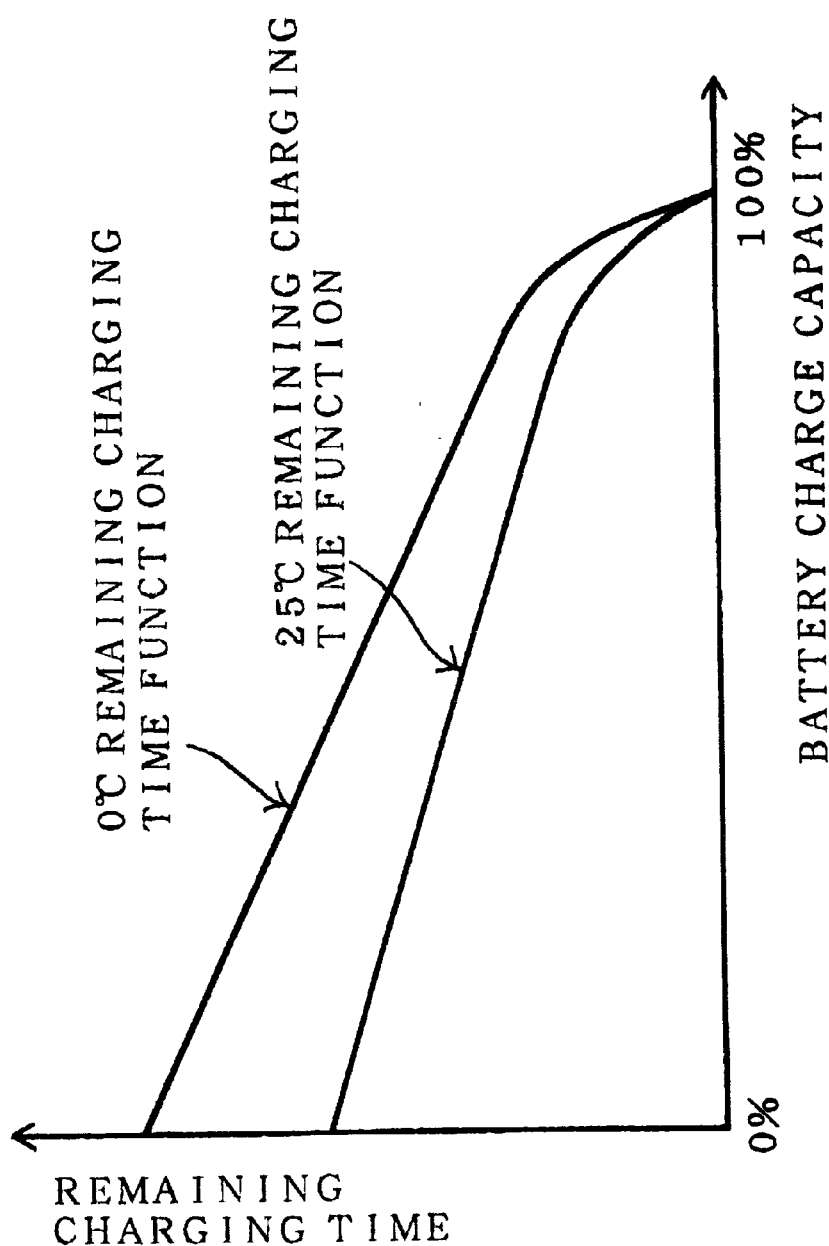
FIG. 2 is a plot of data describing the correlation between rechargeable battery charge capacity and time to completion of charging.
Figure 3:
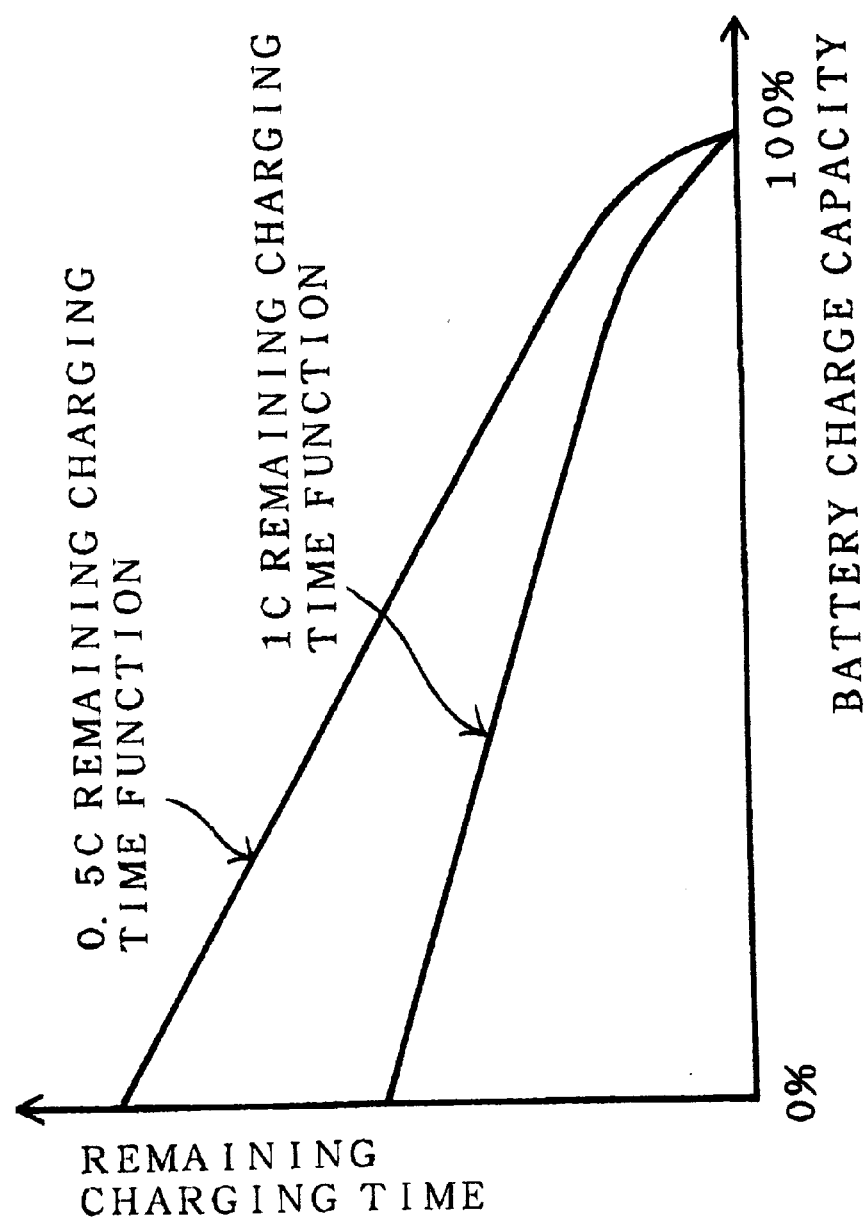
FIG. 3 is a plot of data describing the correlation between rechargeable battery charge capacity and time to completion of charging.

On the other hand, instead of data correlating rechargeable battery 10 charge capacity and time to completion of charging, as shown in FIG. 2, a plurality of data correlating charge capacity and time to completion of charging for each charging current during constant current charging, as shown in FIG. 3, may be pre-stored in memory. In the present embodiment, data for charging currents of 0.5CmA and 1CmA during constant current charging are pre-stored in memory. This data is generated by actual measurements of rechargeable battery 10 charge capacity and charging time during actual chargings of rechargeable batteries 10 with zero charge capacity, a battery temperature of 25° C., and a charging voltage regulated to 4.10V/cell.

In this case also, the computation circuit 17 calculates time to completion of charging by an appropriate choice of data stored in memory depending on the amount of charging current measured by the current sensing circuit 16 during constant current charging. Other operations (including compensation of the time to completion of charging) are similar to a previously described case and detailed description is omitted.

Finally, the present invention is not limited to the lithium ion rechargeable batteries described in the above embodiment, and may be applied to other types of rechargeable batteries.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims or equivalence of such metes and bounds thereof are therefore intended to be embraced by the claims.

What is claimed is:

1. A battery charging apparatus comprising:
   a memory circuit to pre-store data characterizing a correlation between rechargeable battery charge capacity and time to completion of charging;
   a charge capacity measuring circuit to measure a rechargeable battery charge capacity during charging; and
   a calculating circuit to calculate, during charging, a time to completion of rechargeable battery charging based on the rechargeable battery charge capacity measured by said charge capacity measuring circuit and the correlation data stored in said memory circuit.

2. A battery charging apparatus as recited in claim 1, wherein said charge capacity measuring circuit has a current sensing circuit to measure a rechargeable battery charging current, and a computation circuit to determine the rechargeable battery charge capacity, during charging, by time integration of charging current measured by said current sensing circuit.

3. A battery charging apparatus as recited in claim 2, wherein said computation circuit determines the rechargeable battery charge capacity by adding integrated charge capacity to residual rechargeable battery charge capacity remaining at a start of charging.

4. A battery charging apparatus as recited in claim 2, wherein said computation circuit is also used as said calculating circuit.

5. A battery charging apparatus as recited in claim 1, wherein the rechargeable batteries are lithium ion rechargeable batteries.

6. A battery charging apparatus as recited in claim 1, wherein the calculation of the time to completion of charging by said calculating circuit is performed continuously or periodically until the rechargeable batteries reach full charge.

7. A battery charging apparatus as recited in claim 2, wherein said computation circuit determines an actual charge capacity when a full rechargeable battery charge is detected, a compensation factor is determined by comparing the actual charge capacity with a nominal charge capacity, and the time to completion of charging is calculated with the compensation factor.

8. A battery charging apparatus comprising:
   a memory circuit to pre-store a plurality of data-sets characterizing a correlation between rechargeable battery charge capacity and time to completion of charging for each of a plurality of rechargeable battery temperatures;
   a charge capacity measuring circuit to measure a rechargeable battery charge capacity during charging;
   a temperature sensing circuit to measure a rechargeable battery temperature during charging;
   a calculating circuit to calculate, during charging, a time to completion of rechargeable battery charging based on the rechargeable battery charge capacity measured by said charge capacity measuring circuit, the battery temperature measured by said temperature sensing circuit, and the correlation data stored in said memory circuit.

9. A battery charging apparatus as recited in claim 8, wherein said charge capacity measuring circuit has a current sensing circuit to measure a rechargeable battery charging current, and a computation circuit to determine the rechargeable battery charge capacity, during charging, by time integration of charging current measured by said current sensing circuit.

10. A battery charging apparatus as recited in claim 9, wherein said computation circuit determines the rechargeable battery charge capacity by adding integrated charge capacity to residual rechargeable battery charge capacity remaining at a start of charging.

11. A battery charging apparatus as recited in claim 9, wherein said computation circuit is also used as said calculating circuit.

12. A battery charging apparatus as recited in claim 8, wherein the rechargeable batteries are lithium ion rechargeable batteries.

13. A battery charging apparatus as recited in claim 8, wherein said memory circuit stores a plurality of data-sets characterizing the correlation between rechargeable battery charge capacity and time to completion of charging for each of a plurality of charging currents during constant current charging.

14. A battery charging apparatus as recited in claim 8, wherein the calculation of the time to completion of charging by said calculating circuit is performed continuously or periodically until the rechargeable batteries reach full charge.

15. A battery charging apparatus as recited in claim 9, wherein said computation circuit determines an actual charge capacity when a full rechargeable battery charge is detected, a compensation factor is determined by comparing the actual charge capacity with a nominal charge capacity, and the time to completion of charging is calculated with the compensation factor.

16. A battery charging apparatus for charging rechargeable batteries with constant current and constant voltage comprising:
   a memory circuit to pre-store a plurality of data-sets characterizing a correlation between rechargeable battery charge capacity and time to completion of charging for each of a plurality of charging currents during constant current charging;
   a charge capacity measuring circuit to measure a rechargeable battery charge capacity during charging;
   a calculating circuit to calculate, during charging, a time to completion of rechargeable battery charging based on charging current during the constant current charging, the rechargeable battery charge capacity measured by said charge capacity measuring circuit, and the correlation data stored in said memory circuit.

17. A battery charging apparatus as recited in claim 16, wherein said charge capacity measuring circuit has a current sensing circuit to measure a rechargeable battery charging current, and a computation circuit to determine the rechargeable battery charge capacity, during charging, by time integration of charging current measured by said current sensing circuit.

18. A battery charging apparatus as recited in claim 17, wherein said computation circuit determines the rechargeable battery charge capacity by adding integrated charge capacity to residual rechargeable battery charge capacity remaining at a start of charging.

19. A battery charging apparatus as recited in claim 17, wherein said computation circuit is also used as said calculating circuit.

20. A battery charging apparatus as recited in claim 16, wherein the rechargeable batteries are lithium ion rechargeable batteries.

21. A battery charging apparatus as recited in claim 16, wherein the calculation of the time to completion of charging by said calculating circuit is performed continuously or periodically until the rechargeable batteries reach full charge.

22. A battery charging apparatus as recited in claim 17, wherein said computation circuit determines an actual charge capacity when a full rechargeable battery charge is detected, a compensation factor is determined by comparing the actual charge capacity with a nominal charge capacity, and the time to completion of charging is calculated with the compensation factor.

* * * * *